(12) United States Patent
Wilda et al.

(10) Patent No.: US 7,228,948 B2
(45) Date of Patent: Jun. 12, 2007

(54) HYDRAULIC SUSPENSION DAMPER

(75) Inventors: Waldemar Wilda, Krakow (PL);
Lukasz Piotrowski, Jaroslaw (PL);
Marcin Knapczyk, Krakow (PL)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/064,378

(22) Filed: Feb. 23, 2005

(65) Prior Publication Data

US 2005/0183911 A1 Aug. 25, 2005

(30) Foreign Application Priority Data

Feb. 23, 2004 (GB) .................................. 0403814.7
Mar. 17, 2004 (GB) .................................. 0405982.0

(51) Int. Cl.
*F16F 9/34* (2006.01)

(52) U.S. Cl. .................................. 188/322.15; 188/283

(58) Field of Classification Search ........... 188/322.15, 188/282.5, 282.6, 317, 316, 322.13, 322.22, 188/283; 267/162

See application file for complete search history.

(56) References Cited

U.S. PATENT DOCUMENTS 5,639,074 A * 6/1997 Greenhill et al. ........... 267/162

2002/0096408 A1  7/2002 Moradmand et al.
2002/0189914 A1* 12/2002 Naples et al. .......... 188/322.15

FOREIGN PATENT DOCUMENTS

| DE | 35 30 395 | 2/1987 |
| GB | 2 124 328 | 2/1984 |
| GB | 2314602 | 1/1998 |
| GB | 2376514 | 12/2002 |

* cited by examiner

*Primary Examiner*—Christopher P. Schwartz
(74) *Attorney, Agent, or Firm*—Scott A. McBain

(57) ABSTRACT

A hydraulic damper including a tube filled with working liquid which contains a slidable piston assembly attached to a piston rod. The piston assembly includes a piston having a compression valve arrangement to control the flow of working liquid passing through the piston during the compression stroke of the damper. The compression valve arrangement includes a stack of resilient deflectable disks placed on one axial side of the piston and covering compression flow passages in the piston, a spring, spring seat guide and a spring retainer, the spring mounted between the spring seat and the spring retainer. The spring biases the axially slidable spring seat against the stack of disks to normally close the compression flow passages, and the stack of disks is held by the spring seat. The spring seat guide may also be provided with rebound flow passages linked with flow passages in the piston.

12 Claims, 5 Drawing Sheets

HYDRAULIC SUSPENSION DAMPER

BACKGROUND OF THE INVENTION

1. Field of the Invention

The present invention relates to a hydraulic damper, in particular to a hydraulic damper for the suspension system of a motor vehicle.

2. Background Art

Hydraulic suspension dampers typically include a tube filled with working liquid, inside of which a slidable piston assembly is placed. The piston assembly is attached to a piston rod led outside the tube through the piston rod guide, and includes a piston with rebound valve arrangement having a number of flow passages disposed around the piston at radially inner side thereof and compression valve arrangement having a number of flow passages disposed around the piston at radially outer side thereof. The valve arrangements control the flow of working liquid passing through the piston assembly during the rebound and the compression stroke of the damper.

Each valve arrangement usually includes a stack of resilient disks covering the flow passages of the piston and acting as one-way valve deflecting or moving under, the pressure of the working liquid to allow flow of fluid. Disks of the compression valve arrangement are typically of larger diameter than disks of the rebound stroke arrangement. Number shape, diameter and thickness of each disk provide an adjustable compression and rebound damping forces.

To achieve a blow-off characteristic of the damper during the rebound stroke (i.e., high digressivity of the damping force for high piston velocities), the arrangements disclosed by GB 2,314,602 and GB 2,376,514 have the deflectable disks of the rebound stroke valve are biased to a closed position by a coil spring which engages a nut which is screw threaded to the piston rod and a spring seat which is axially slidable relative to the nut and which engages the deflectable disks.

SUMMARY AND ADVANTAGES OF THE INVENTION

The present invention provides a hydraulic suspension damper featuring a high digressivity also during the compression stroke, which is simple and uncomplicated to compose when compared to previously known arrangements, and may be achieved without any necessity to axially orientate the elements of the piston assembly. The present invention also provides a hydraulic suspension damper featuring above-mentioned characteristics, which enables easy modification of existing dampers constructions, and may cooperate with additional rebound stops commonly placed at the piston rod guide.

A damper according to the present invention is provided with the compression valve arrangement including a stack of resilient deflectable disks placed above the piston and covering the compression flow passages of the piston, a spring, mounted around the spring seat guide between the spring seat and a spring retainer, the spring acting by axially slidable spring seat on the stack of disks to normally close the compression flow passages of the piston. The stack of disks is held at least on the internal peripheral area thereof by the spring seat. Furthermore the spring seat guide is provided with rebound flow passages linked with the flow passages of the piston.

High digressivity of the proposed construction is achieved by the disk surface increase after the opening point of the disk stack, when spring is compressed. The spring seat retains the disk stack. The distance between the spring seat and the spring retainer determines the preload of the spring, which in turn determines the damper characteristic. Moreover, the rebound flow passages of the spring seat guide allow hydraulic fluid to pass through the compression chamber enabling to use a spring of a large diameter.

In accordance with the present invention, it is possible to use a spring retainer having a relatively large diameter as an element of an additional rebound stop.

Further, in accordance with the present invention, it is possible to easily upgrade existing piston assembly constructions with no need to modify the rebound valve arrangements thereof.

To achieve an even distribution of the load of the spring, the spring may be a wave spring. Moreover, by using a wave spring the piston assembly has more compact construction, as the height of the wave spring may be lower comparing to the coil spring of the same characteristic.

Advantageously, the inlets of the rebound flow passages of the spring seat guide are surrounded by the spring, so they extend radially, rather than in the axial direction, which is particularly convenient as they are not blocked, while the spring retainer is used as a bumper of the rebound stop.

The spring seat may have an annular groove on its surface abutting the disk stack of the compression valve arrangement, where the stack of disks includes at least two disks, the diameter of at least one of which is at least partially smaller than the diameter of the remaining disks.

The groove prevents the disk adjoining the spring seat from sticking in its deflected position and eliminates the noise that might otherwise occur during its return to the normal, undeflected position.

To facilitate assembling the piston assembly, the spring seat guide may have an annular channel covering the openings of the rebound flow passages of the piston and extending into flow passages of the spring seat guide.

As the channel extends circumferentially along spring seat guide, there is no need to axially orient the spring seat guide during assembling of the piston assembly. Moreover, such a construction enables application of existing piston parts.

Alternatively, it is convenient to integrate the spring seat guide and the piston with one another.

Moreover, it is convenient to integrate the spring retainer and the spring seat guide with one another.

A damper in accordance with the present invention may be a mono-tube damper.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
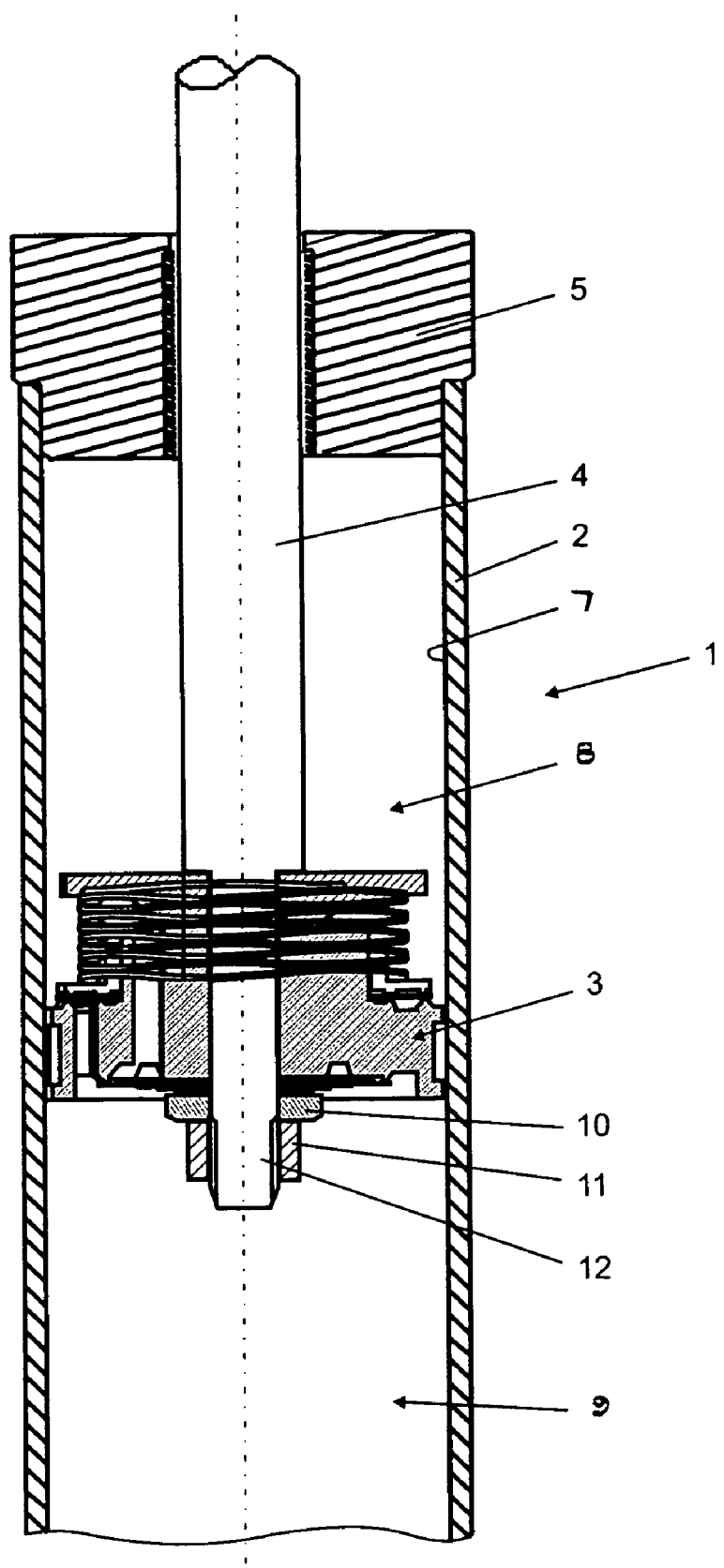
FIG. 1 is a fragmentary schematic cross-sectional view of a mono-tube hydraulic damper according to the present invention.

Corresponding reference characters indicate corresponding parts throughout the several views. Although the drawings represent embodiments of the present invention, the drawings are not necessarily to scale and certain features may be exaggerated or simplified in order to better illustrate and explain the present invention. The exemplifications set out herein illustrate embodiments of the invention in several forms, and such exemplifications are not to be construed as limiting the scope of the invention in any manner.

DETAILED DESCRIPTION OF THE INVENTION

FIG. 1 partially depicts hydraulic suspension damper 1 in accordance with the present invention that includes tube 2 filled with working liquid, and inside of which axially movable piston assembly 3 is located. Piston assembly 3 is attached to piston rod 4, which extends outside damper 1 through piston rod guide 5 at one end of tube 2. At its other end (not shown), tube 2 is closed by a compensation valve arrangement (not shown). Tube 2, piston rod 4 and piston rod guide 5 have a typical design known to persons of ordinary skill in the art and shall not herein be described in detail.

Piston assembly 3 makes a sealing sliding fit with inside surface 7 of tube 2 and separates tube 2 into rebound chamber 8 and compression chamber 9. Piston assembly 3 further includes a piston provided with rebound and compression flow passages each having associated check valves to control flow of working liquid passing through the piston during the rebound and the compression stroke of damper 1, to damp reciprocating movement of the piston and the piston rod along the longitudinal axis of tube 2. Piston assembly 3 is secured to piston rod 4 by washer 10 and nut 11 screwed on threaded end portion 12 of piston rod 4. A hydraulic damper as so far described is of the kind commonly used as a part of a motor vehicle suspension.

Figure 2:
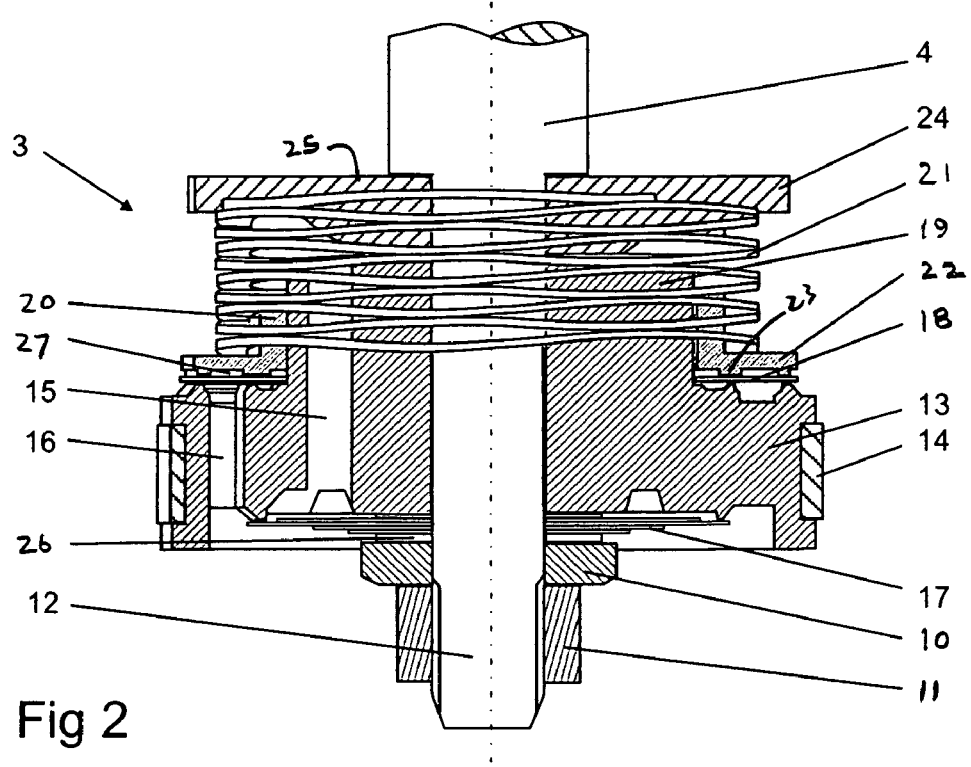
FIG. 2 is a cross-sectional view of a first embodiment of the piston assembly of the inventive damper.

First embodiment piston assembly 3 of a damper according to the present invention is shown in FIG. 2. Piston assembly 3 includes piston 13, which is substantially axially symmetrical and provided with annular seal 14 provides sealing with inner surface 7 of tube 2. Seal 14 may be made from a PTFE material such as Teflon®. Piston 13 is also provided with a centrally-positioned through bore having an inner diameter corresponding to the outer diameter of threaded end portion 12 of piston rod 4.

Figure 4:
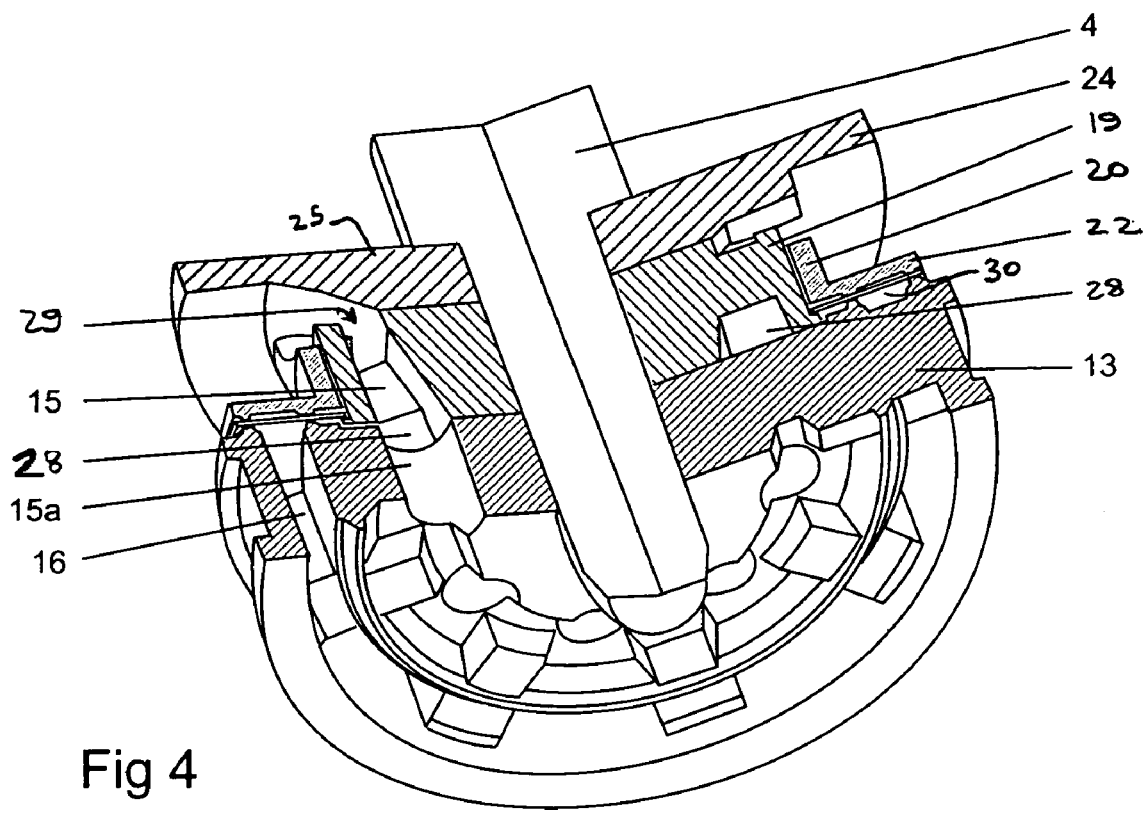
Figure 7:
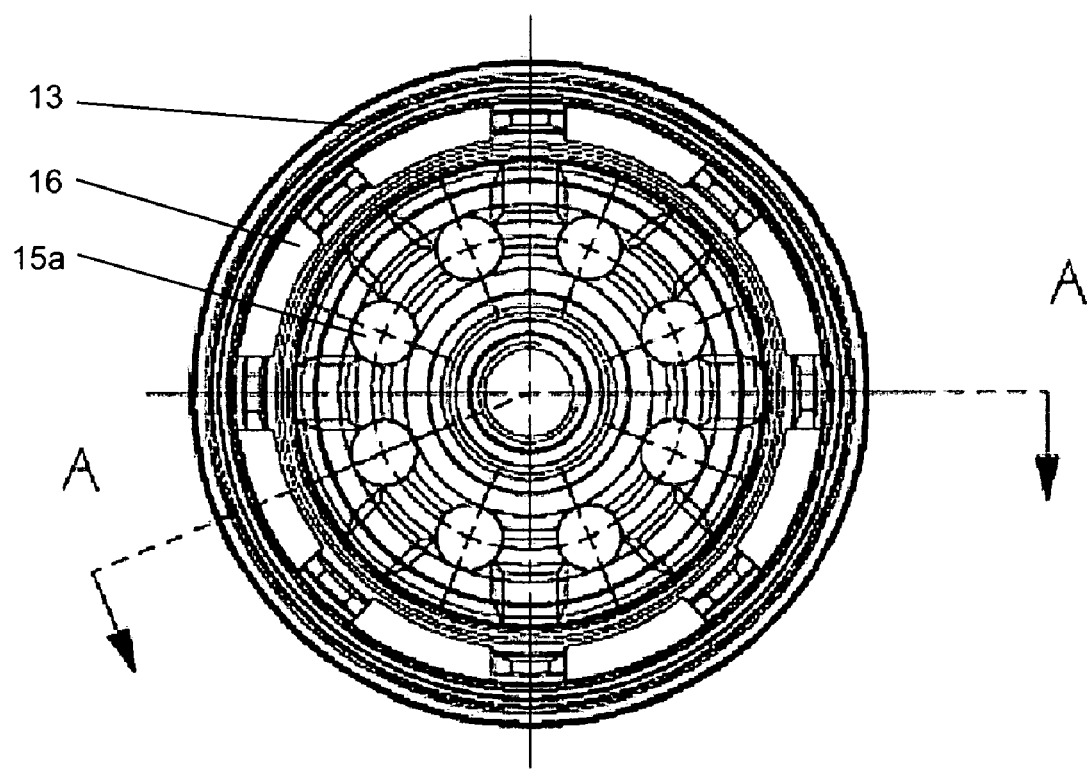
FIG. 7 is a bottom view of the third embodiment of the piston assembly of the inventive damper, with certain component omitted.

Furthermore, piston 13 is provided with a number of rebound flow passages 15 and a number of compression flow passages 16. Although many different arrangements, designs and constructions of the flow passages are equally possible here, in all embodiments herein described, both rebound 15 and compression 16 flow passages are substantially parallel to the longitudinal axis of tube 2 and equiangularly spaced around the periphery of the piston as best seen in FIGS. 4 and 7, where it is also shown that the circle formed by the distribution of compression flow passages 16 is of larger diameter than the circle formed by distribution of rebound flow passages 15.

Referring again to FIG. 2, the outlets of rebound flow passages 15 are closed by stack 17 of resilient deflectable disks that are part of a rebound valve arrangement. Disk stack 17 includes a number of stacked disks (in this embodiment five), each in the form of a thin ring. The number of disks may vary and their shape, design and other features are well known to a person of ordinary skill in the art. By way of example, one of disks may be provided with a check valve, one of disks may have smaller diameter than the others, the disks may or may not be angularly positioned, . . . etc. . . .

The outlets of compression flow passages 16 are similarly closed by stack 18 of a number of resilient deflectable disks (that may vary but in this embodiment is two) that are part of a compression valve arrangement. Disk stack 18 is disposed about or around spring seat guide 19, which in this embodiment forms an integral, upper portion of piston 13. Clearance exists between the outer cylindrical surface of spring seat guide 19 and the interfacing circular edge of the central openings in disks of stack 18, thereby facilitating axial, sliding movement of the disk(s) when the compression valve arrangement opens. In its closed position disk stack 18 is held between superposed portions of piston 13 and radial flange 22 of spring seat 20. Annular spring seat 20 is also disposed about or around spring seat guide 19 and is slidable relative thereto in axial directions. The compression valve arrangement is biased into its closed position by spring force bearing against radial flange 22 as described further below.

The proper choice of disks stacks 17 and 18, in particular with respect to the flow resistances, essentially contributes to the required characteristics of the hydraulic damper during the rebound stroke.

To enable deflection of the disks in stack 18 under the pressure of the working liquid flowing from compression chamber 9 to rebound chamber 8 through piston compression flow passages 16 during the damper's compression stroke, disk stack 18 is held by projection 23 of flange 22 at the internal opening thereof.

Spring 21 is, in this embodiment, a wave spring and is mounted between the upper side of flange 22 of spring seat 20 and flange 24 of spring retainer 25 disposed on piston rod 4. Spring 21 is preloaded by space washer 26, washer 10 and nut 11, and biases flange 22 of spring seat 20, the projection 23 and finally the disk stack 18 to normally close compression flow passages 16. The elastic force of the spring 21 may, among others, be adjusted by a varying the distance between the upper face of the flange 22 of the spring seat 20 and the lower face of the flange 24 of the spring retainer 25.

The inlets of the rebound flow passages 15 are surrounded by the spring 21, which enables the spring retainer 25 to operate as a buffer for an additional rebound stop (not shown) of damper 1, preferably located at piston rod guide 5.

The piston, the spring seat and the spring retainer may be formed from sintered steel.

Other embodiments of the piston assembly according to the present invention are described below. Reference numerals of the same functional elements correspond to those from FIGS. 1 and 2.

Figure 3:
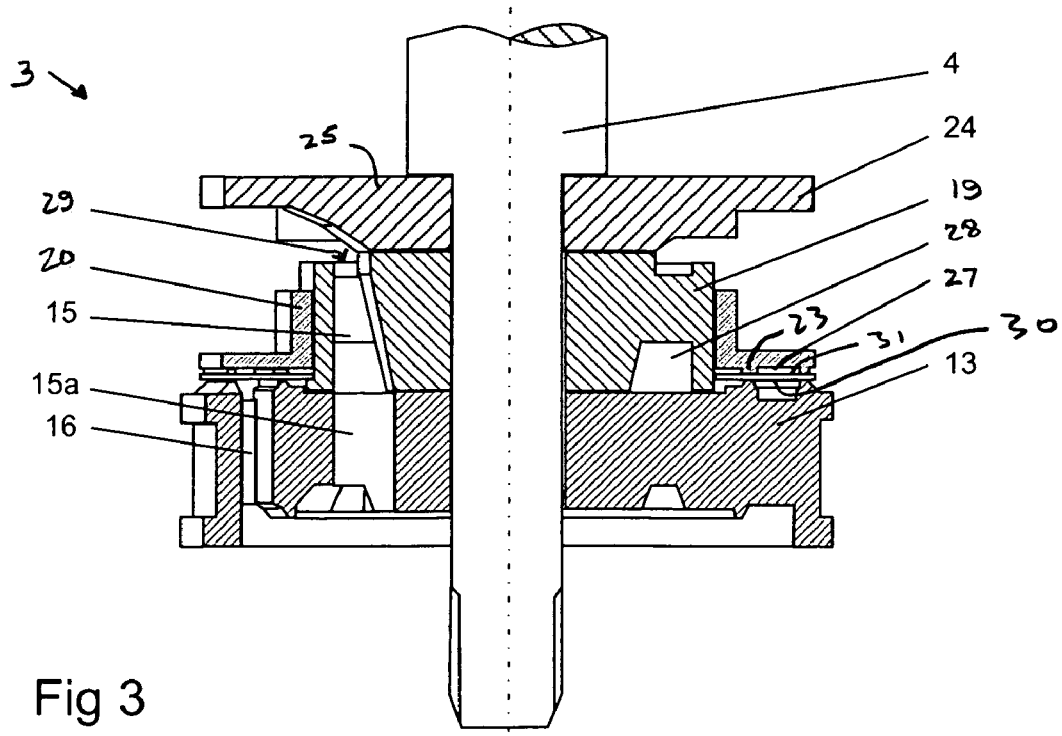
FIG. 3 and FIG. 4, respectively, are cross-sectional and perspective cross-sectional views of a second embodiment of the piston assembly of the inventive damper, with certain components omitted.

FIG. 3 and FIG. 4 present other embodiments of the piston assembly according to the present invention, with spring 21, washer 10, nut 11 and seal 14 omitted for better clarity of the drawing. In this case, piston 13 and spring seat guide 19 separate component parts of spring assembly 3. Among others, this fact enables easy modification of existing piston assemblies to operate as the piston assembly of the present invention by installing only a few additional elements, such as spring seat guide 19, spring seat 20, spring 21 and spring retainer 25.

For ease of manufacture of piston assembly 3, spring seat guide 19 is further provided with annular channel 28 covering the inlets of rebound flow passages 15a of piston 13. Annular channel 28 is in fluid communication at some points with rebound flow passages 15 of spring seat guide 19. Thanks to the above it is not required to orientate spring seat guide 19 in order to align rebound flow passages 15 of spring seat guide 19 with rebound flow passages 15a of piston 13.

As shown in the drawing, inlets 29 of rebound flow passages 15 are disposed in the upper face of spring seat guide 19, and after mounting spring 21 between spring guide 20 and spring retainer 25, they shall be surrounded by spring 21.

As in the first embodiment, flange 22 of spring seat 20 is provided with annular groove 27, which prevents the disks from sticking to the spring seat in the deflected position and eliminates the noise that might otherwise occur during return to the normal (undeflected) position.

As in the first embodiment, disk stack 18 of the compression valve arrangement of this embodiment includes two disks: lower disk 30 which covers the outlets of compression passages 16; and upper disk 31 which is here substantially elliptical.

Figure 5:
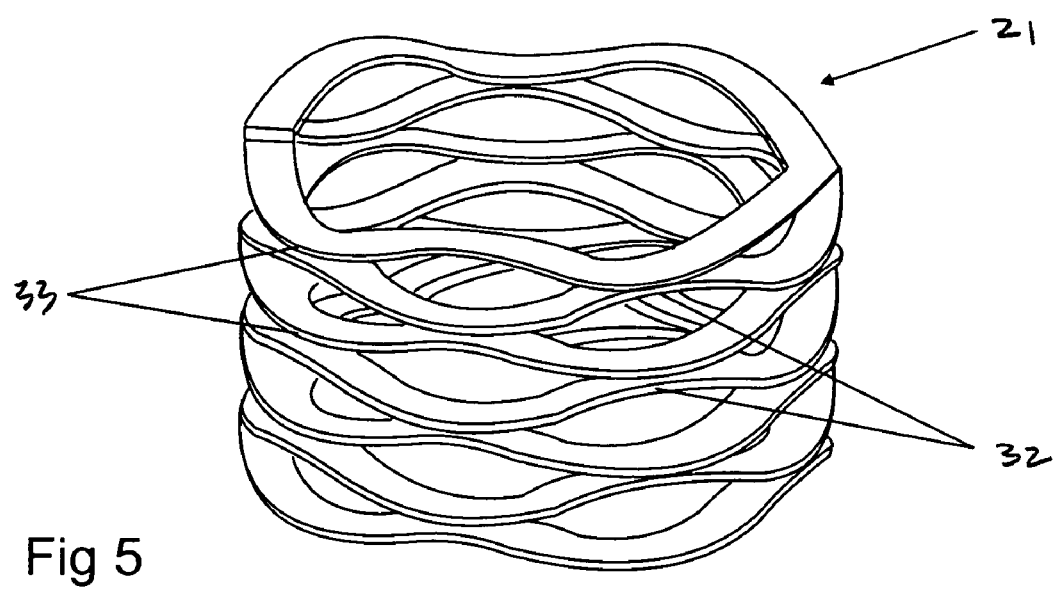
FIG. 5 is a perspective view of the wave spring of the first and the second embodiments of the piston assembly of the inventive damper.

The construction of spring 21 employed in the first and second embodiments of piston assembly 3 is presented in FIG. 5. In this embodiment, wave spring 21 is made of a single, coiled strip of material such as carbon or stainless steel and formed from a plurality of turns. Ridges 32 and troughs 33 of adjacent turns in wave spring 21 are in abutting contact with each other. Obviously, other configurations of spring 21 (e.g., a stack of wave springs each having a circular form closed by overlapping ends) are equally possible. The configuration and properties of the spring are selected in dependence of the required damper characteristics.

Figure 6:
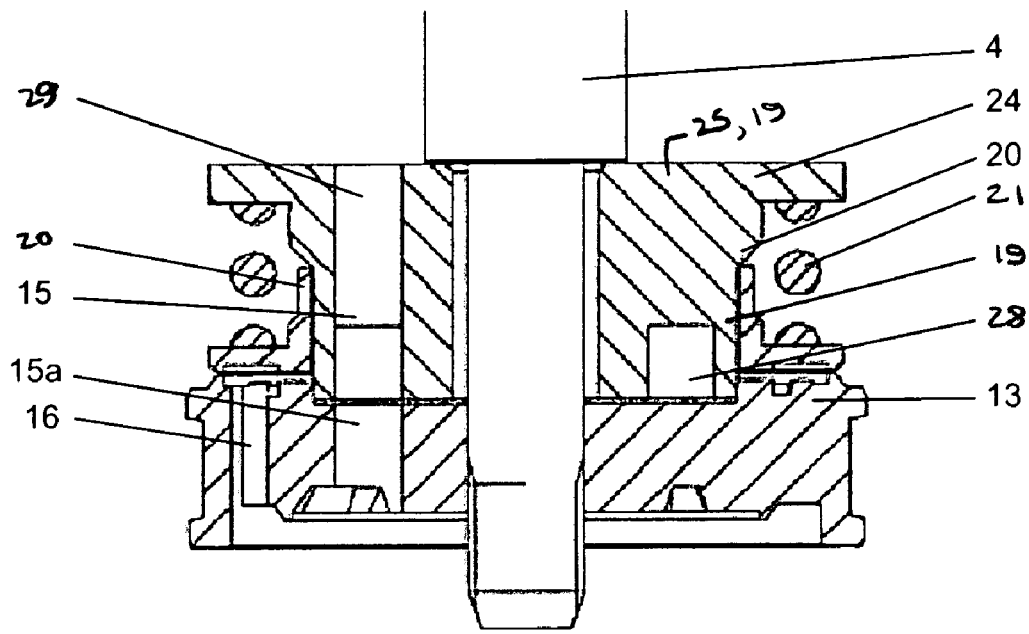
FIG. 6 is a cross-sectional view of a third embodiment of the piston assembly of the inventive damper, along the line A—A of FIG. 7.

FIG. 6 and FIG. 7 show yet another embodiment of the piston assembly. In this case spring seat guide 19 and spring retainer 25 are integrated into one component part, preferably made from sintered metal. In this embodiment spring 21 is a coil spring and inlets 29 of rebound flow passages 15 are located in an axial end surface of spring retainer 25.

Figure 8:
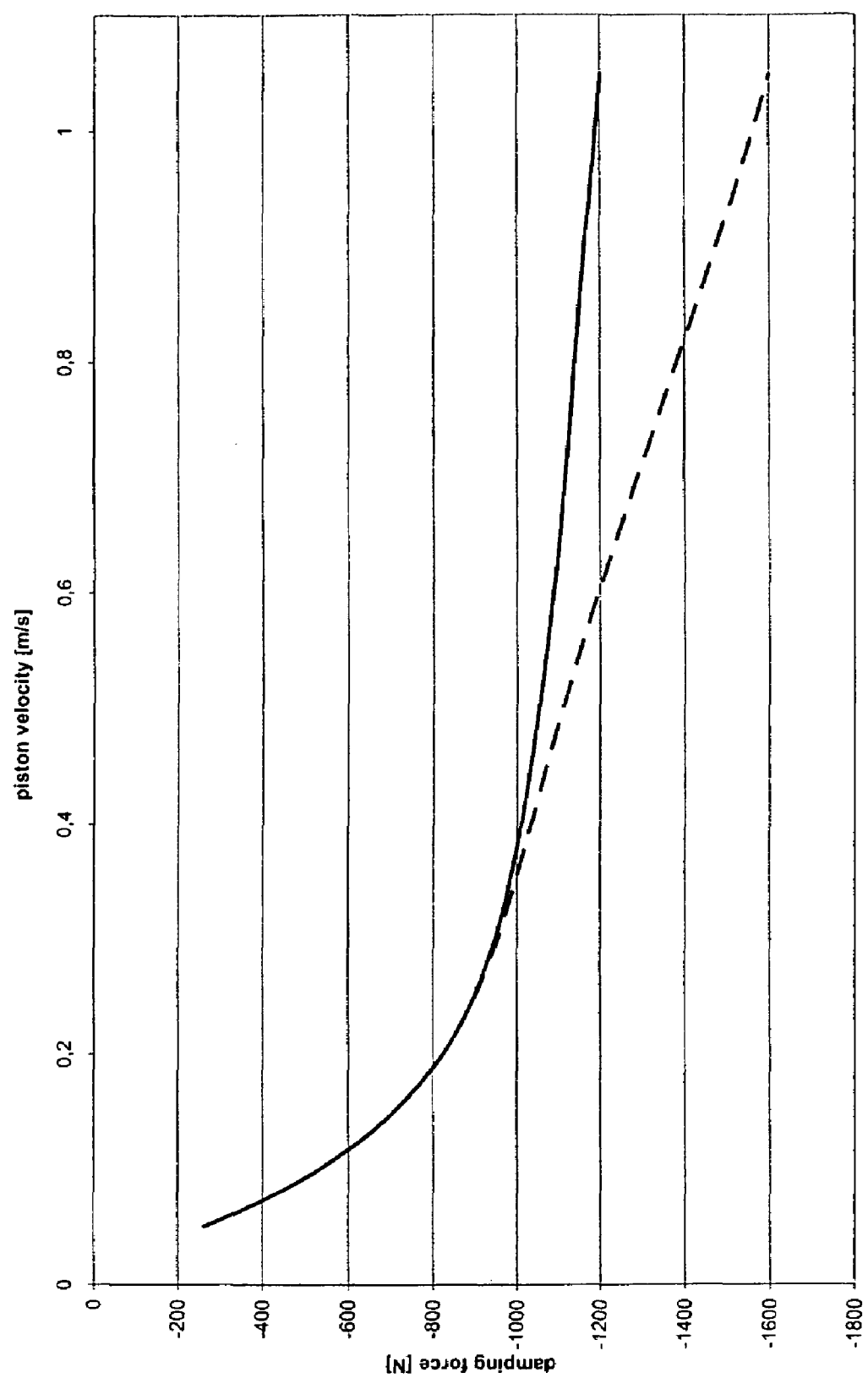
FIG. 8 is a graph of damping force vs. piston velocity during the compression stroke for dampers that include the inventive third piston assembly embodiment and a typical piston assembly.

FIG. 8 shows graphs of damping force vs. piston velocity during the compression stroke of the damper for embodiment of the piston assembly shown in FIGS. 6 and FIG. 7 (solid line) and for the piston assembly without the spring arrangement (dashed line).

During the compression stroke of the piston assembly, pressurized working fluid flows from compression chamber 9 to rebound chamber 8 through compression flow passages 16, urging compression valve disk stack 18 and flange 22 of spring seat 20 against the force of spring 21. When the piston velocity is low, the disks of stack 18 deflect, allowing the fluid to pass through piston 13, and the characteristics of damper 1 correspond to the characteristics of a damper not provided with the inventive compression valve arrangement that includes spring 21.

High digressivity (i.e. blow-off characteristic of the damper) is achieved due to an increased opening of disk stack 18 above a certain speed of the piston, where the pressure of the working fluid exerted on disk stack 18 exceeds the reaction force of spring 21. The pressure forces acting on disk stack 18 makes spring seat 22 slide towards spring retainer 25, compressing spring 21 and increasing the flow of the working fluid through piston 13.

When the damper operates as a part of a vehicle suspension system, the above features are particularly advantageous as the damper exerts small damping forces on the vehicle chassis during driving the vehicle on a regular road, as well as i.e. during curb bump, where the piston velocity in the compression stroke is high. Consequently the blow-off characteristic of the damper essentially contributes to the comfort of using the vehicle.

While this invention has been described through exemplary embodiments, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A hydraulic damper having a compression stroke and a rebound stroke, said hydraulic damper comprising:
   a tube filled with a working liquid;
   a piston rod extending outside of said tube;
   a slidable piston assembly disposed inside said tube and attached to said piston rod, said piston assembly comprising:
   a piston having a number of rebound flow passages and compression flow passages disposed around the piston and through which the working liquid flows, said rebound flow passages being located radially inward of said compression flow passages;
   a rebound valve arrangement that controls the flow of the working liquid passing through the piston during the rebound stroke of the damper; and
   a compression valve arrangement that controls the flow of the working liquid passing through the piston during the compression stroke of the damper, said compression valve arrangement comprising:
   a spring retainer disposed on said rod,
   a spring seat guide located on one axial side of the piston, said spring seat guide provided with rebound flow passages linked with said rebound flow passages of said piston to form continuous axial passages through the piston and the spring guide,
   a spring seat disposed about said spring seat guide and being axially slidable therealong,
   a stack of resilient deflectable disks placed over said piston and covering said compression flow passages of the piston, said stack of resilient disks being held by said spring seat and being disposed radially outward of the spring seat guide and the continuous passages through the piston and the spring seat guide, and
   a spring mounted around said spring seat guide between said spring seat and said spring retainer, said spring acting through axially slidable spring seat on said stack of disks whereby said compression flow passages are normally closed.

2. The hydraulic damper of claim 1, wherein said spring is one of a wave spring and a coil spring.

3. The hydraulic damper of claim 1, wherein inlets of said spring seat guide rebound flow passages are surrounded by said spring.

4. The hydraulic damper of claim 1, wherein a surface of said spring seat that abuts said stack of disks is provided with an annular groove.

5. The hydraulic damper of claim 1, wherein said stack of disks comprises at least two disks, the diameter of at least one disk being at least partially smaller than the diameter of the remaining disks.

6. The hydraulic damper of claim 5, wherein said at least one disk is substantially elliptical.

7. The hydraulic damper of claim 1, wherein said spring seat guide has an annular channel, said piston rebound flow passages and said spring seat guide rebound flow passages opening into said channel.

8. The hydraulic damper of claim 1, wherein said spring seat guide and said piston are formed as an integral element.

9. The hydraulic damper of claim 1, wherein said spring seat guide and said piston comprise separate components of said piston assembly.

10. The hydraulic damper of claim 1, wherein said spring retainer and said spring seat guide are integrated with one another.

11. The hydraulic damper of claim 1, wherein said spring retainer and said spring seat guide comprise separate components of said piston assembly.

12. The hydraulic damper of claim 1, wherein said damper is a mono-tube damper.

* * * * *